(12) United States Patent
Nakadate

(10) Patent No.: US 6,782,980 B2
(45) Date of Patent: Aug. 31, 2004

(54) CONTROLLABLE DAMPING FORCE HYDRAULIC SHOCK ABSORBER

(75) Inventor: Takao Nakadate, Kanagawa (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 10/305,342

(22) Filed: Nov. 27, 2002

(65) Prior Publication Data

US 2003/0132073 A1 Jul. 17, 2003

(30) Foreign Application Priority Data

Nov. 29, 2001 (JP) ........................................ 2001-364419

(51) Int. Cl.$^7$ ................................................. F16F 9/00
(52) U.S. Cl. ..................................... 188/313; 188/317
(58) Field of Search ........................... 188/282.1, 282.2, 188/282.3, 282.4, 313, 316, 317, 319.1, 319.2, 266.5, 282.5

(56) References Cited

U.S. PATENT DOCUMENTS

| | | | | |
|---|---|---|---|---|
| 4,953,671 A | * | 9/1990 | Imaizumi | 188/282.3 |
| 5,655,633 A | * | 8/1997 | Nakadate et al. | 188/266.6 |
| 6,371,262 B1 | * | 4/2002 | Katou et al. | 188/266.5 |
| 6,374,967 B2 | * | 4/2002 | Matsumoto et al. | 188/282.4 |
| 6,474,454 B2 | * | 11/2002 | Matsumoto et al. | 188/319.1 |

\* cited by examiner

Primary Examiner—Thomas Williams
(74) Attorney, Agent, or Firm—Wenderoth, Lind & Ponack, L.L.P.

(57) ABSTRACT

A piston having a piston rod connected thereto is slidably fitted in a cylinder in which a hydraulic fluid is sealably contained. Extension-stroke and compression-stroke pilot type damping force control mechanisms are provided in the piston. A pilot control valve of the extension-stroke pilot type damping force control mechanism is formed by a pressure control valve having a valve seat, a valve body and a pressure-receiving portion. A pilot control valve of the compression-stroke pilot type damping force control mechanism is formed by a flow rate control valve having a spool. A slider having the valve body of the pressure control valve and the spool of the flow rate control valve is operated by a proportional solenoid, to thereby control a damping force for an extension stroke and a damping force for a compression stroke.

4 Claims, 3 Drawing Sheets

CONTROLLABLE DAMPING FORCE HYDRAULIC SHOCK ABSORBER

BACKGROUND OF THE INVENTION

The present invention relates to a controllable damping force hydraulic shock absorber which is mounted on a suspension apparatus of a vehicle such as an automobile.

As a hydraulic shock absorber mounted on a vehicle such as an automobile, there is known a controllable damping force hydraulic shock absorber in which damping force characteristics can be appropriately controlled according to road surface conditions, vehicle running conditions, etc., so as to improve ride comfort and steering stability.

Generally, a controllable damping force hydraulic shock absorber is arranged as follows. A piston, which has a piston rod connected thereto to form a piston assembly, is slidably fitted into a cylinder in which a hydraulic fluid is sealably contained. The piston divides the inside of the cylinder into two chambers. The piston assembly is provided with a main hydraulic fluid passage and a bypass passage which permit communication between the two chambers in the cylinder. The main hydraulic fluid passage is provided with a damping force generating mechanism including an orifice and a disk valve, and the bypass passage is provided with a damping force control valve for changing a flow path area of the bypass passage.

In this arrangement, a small damping force is generated by opening the bypass passage through the damping force control valve so as to reduce a resistance to the flow of the hydraulic fluid between the two chambers in the cylinder. On the other hand, a large damping force is generated by closing the bypass passage so as to increase the flow resistance between the two chambers. Thus, damping force characteristics are controlled by opening/closing the bypass passage through the damping force control valve.

However, when a damping force is controlled only by changing the flow path area of the bypass passage, the following problem arises. That is, although damping force characteristics can be changed to a large extent in a low piston speed region in which a damping force is dependent on the restriction of an orifice in a fluid passage, damping force characteristics cannot be greatly changed in intermediate and high piston speed regions in which a damping force is dependent on the degree of opening of the damping force generating mechanism (disk valve) in the main hydraulic fluid passage.

As a countermeasure, there is known a controllable damping force hydraulic shock absorber, as disclosed in Unexamined Japanese Patent Application Public Disclosure (Kokai) No. 7-332425 (corresponding to U.S. Pat. No. 5,655,633), in which a pilot type damping force control valve is provided as a damping force generating mechanism in each of a main hydraulic fluid passage for an extension stroke and a main hydraulic fluid passage for a compression stroke. In this pilot type damping force control valve, a back-pressure chamber (a pilot chamber) is formed at the back of a disk valve. The back-pressure chamber is communicated through a fixed orifice with a cylinder chamber on the upstream side of the disk valve and communicated with a cylinder chamber on the downstream side of the disk valve through a flow rate control valve (a pilot control valve).

In this controllable damping force hydraulic shock absorber, the flow rate control valve is operated, to thereby change the flow path area of a flow passage between the two chambers in the cylinder, while the pressure in the pilot chamber is changed due to a pressure loss at the flow rate control valve, to thereby change the valve-opening pressure of the disk valve. Thus, orifice characteristics (in which a damping force is approximately proportional to the square of the piston speed) and valve characteristics (in which a damping force is approximately proportional to the piston speed) can be controlled simultaneously, thus making it possible to control damping force characteristics within a wide range.

Further, there is known a controllable damping force hydraulic shock absorber disclosed in Unexamined Japanese Patent Application Public Disclosure (Kokai) No. 2001-12530 (corresponding to U.S. Pat. No. 6,371,262), in which a pilot type damping force control valve is provided in each of an extension-stroke passage and a compression-stroke passage, and a damping force for an extension stroke and a damping force for a compression stroke are directly controlled by means of pilot control valves of a pressure control type.

However, in the above-mentioned conventional controllable damping force hydraulic shock absorbers using pilot type damping force control valves, the following problems arise. Namely, when a valve body of a pilot control valve for an extension stroke and a valve body of a pilot control valve for a compression stroke are integrally formed as a single member so that they are operated by means of a single actuator, the single member usually takes a form of spool valve in the case where the valves function as flow rate control valves. In such a case, the flow rate of the hydraulic fluid is controlled by changing the longitudinal stroke position of the spool to change the flow path area. In this arrangement, from the viewpoint of accuracy of control of the actuator, it is necessary to obtain a substantially long stroke of the spool valve between a position for a minimum flow path area and a position for a maximum flow path area for both an extension stroke and a compression stroke. Consequently, a solenoid used as the actuator is required to have a size sufficient for obtaining a long stroke of the spool valve, thus making it difficult to reduce the size of solenoid. In the case of using pressure control valves as the pilot control valves, damping characteristics of the controllable damping force hydraulic shock absorber relative to a current applied to the solenoid are determined, based on set loads and spring constants of two springs which are provided on opposite sides of the valve bodies with respect to the direction of stroke thereof and which impart bias forces to the valve bodies. Therefore, adjustment of a set load of a spring must be effected, with respect to each of the two springs, in consideration of tolerances of the parts or components affecting the two springs. However, in the above-mentioned Kokai No. 2001-12530, adjustment of a set load of a spring can be effected only on one side of the valve body, and individual adjustments of the set loads of the two springs cannot be effected. Therefore, fine adjustment of a set load of a spring cannot be made. Even when the arrangement is changed so that individual adjustments of the two springs can be effected, the bias forces of the two springs affect each other, so that delicate adjustment is required to achieve optimum setting of the set loads of the springs, thus making it difficult to manufacture the controllable damping force hydraulic shock absorbers on a mass production basis.

BRIEF SUMMARY OF THE INVENTION

In view of the above, the present invention has been made. It is an object of the present invention to provide a controllable damping force hydraulic shock absorber utilizing pilot type damping force control valves, which is compact in size and capable of controlling a damping force within a wide range.

In order to achieve the above-mentioned object, the present invention provides a controllable damping force hydraulic shock absorber comprising: a cylinder in which a hydraulic fluid is sealably contained; a piston slidably fitted in the cylinder; a piston rod having one end connected to the piston and the other end extended to the outside of the cylinder; an extension-stroke passage which allows flow of the hydraulic fluid during an extension stroke of the piston rod; and a compression-stroke passage which allows flow of the hydraulic fluid during a compression stroke of the piston rod. An extension-stroke pilot type damping force control valve is provided so as to control the flow of the hydraulic fluid in the extension-stroke passage due to the effect of a pressure in a pilot chamber, to thereby generate a damping force. A compression-stroke pilot type damping force control valve is provided so as to control the flow of the hydraulic fluid in the compression-stroke passage due to the effect of a pressure in a pilot chamber, to thereby generate a damping force. Each of the extension-stroke pilot type damping force control valve and the compression-stroke pilot type damping force control valve includes a pilot control valve provided therein so as to control the hydraulic fluid in the pilot chamber. Either one of the pilot control valve provided in the extension-stroke pilot type damping force control valve and the pilot control valve provided in the compression-stroke pilot type damping force control valve comprises a flow rate control valve, which is adapted to control a flow path area of a flow passage connected to the pilot chamber to a desired flow path area by means of an actuator. The other pilot control valve comprises a pressure control valve, which is adapted to control the pressure in the pilot chamber to a desired pressure by means of an actuator.

By this arrangement, a damping force is controlled by controlling the pilot pressures of the extension-stroke and compression-stroke pilot type damping force control valves by means of the flow rate control valve and the pressure control valve.

In the present invention, a valve body of the pilot control valve provided in the extension-stroke pilot type damping force control valve and a valve body of the pilot control valve provided in the compression-stroke pilot type damping force control valve may be integrally formed to enable reverse characteristics of damping force to be obtained, the valve bodies being adapted to be operated by a single actuator.

By this arrangement, reverse characteristics of damping force can be obtained by using a single actuator.

The controllable damping force hydraulic shock absorber of the present invention may be arranged, such that the pilot control valve provided in the extension-stroke pilot type damping force control valve comprises the pressure control valve and the pilot control valve provided in the compression-stroke pilot type damping force control valve comprises the flow rate control valve.

Generally, in a controllable damping force hydraulic shock absorber, there is a tendency for a damping force for a compression stroke to be controlled within a narrow range as compared to a damping force for an extension stroke, due to a difference in pressure-receiving area of the piston between an extension stroke and a compression stroke. With the above-mentioned arrangement, damping force characteristics can be controlled within a wide range even during a compression stroke.

The foregoing and other objects, features and advantages of the present invention will become apparent from the following detailed description and appended claims taken in connection with the accompanying drawings.

DETAILED DESCRIPTION OF THE INVENTION

Figure 1:
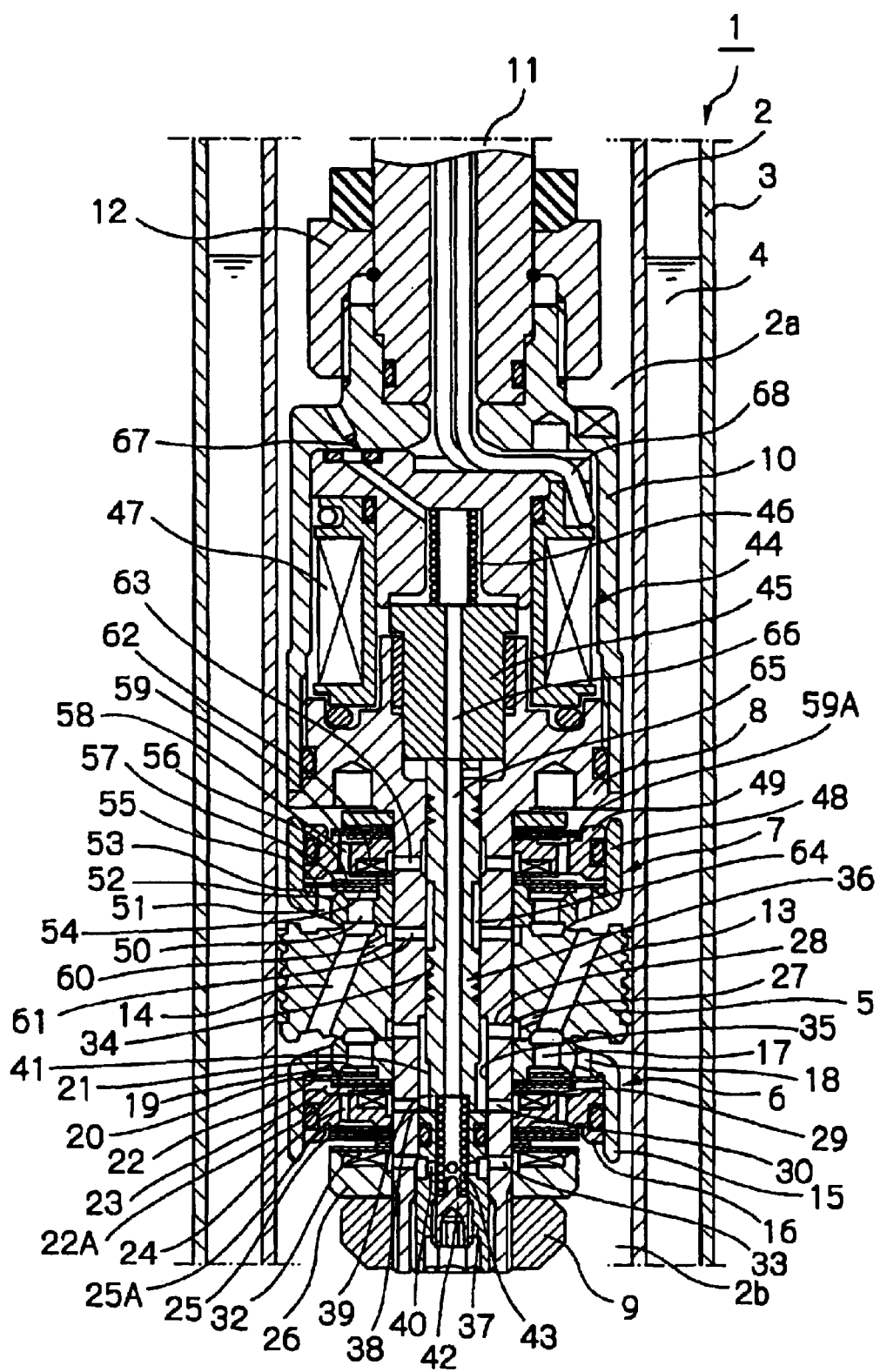
FIG. 1 is a vertical cross-sectional view of an essential part of a controllable damping force hydraulic shock absorber according to an embodiment of the present invention.

Hereinbelow, an embodiment of the present invention is described in detail, referring to the drawings.

As shown in FIG. 1, a controllable damping force hydraulic shock absorber 1 in this embodiment has a double cylinder structure comprising a cylinder 2 and an outer cylinder 3 provided outside the cylinder 2. A reservoir 4 is formed between the cylinder 2 and the outer cylinder 3. A piston 5 is slidably fitted into the cylinder 2 and divides the inside of the cylinder 2 into two chambers, namely, an upper cylinder chamber 2a and a lower cylinder chamber 2b. An extension-stroke damping force control mechanism (an extension-stroke pilot type damping force control valve) 6 and a compression-stroke damping force control mechanism (a compression-stroke damping force control valve) 7 are provided on opposite ends of the piston 5. The piston 5, the extension-stroke damping force control mechanism 6 and the compression-stroke damping force control mechanism 7 are integrally connected to each other by means of a cylindrical piston bolt 8 extended therethrough and a nut 9.

A solenoid case 10 is threadably engaged with a large-diameter proximal end portion of the piston bolt 8. An end portion of a piston rod 11 is connected to the solenoid case 10 by means of a nut 12. The other end portion of the piston rod 11 extends through the upper cylinder chamber 2a, and a rod guide (not shown) and an oil seal (not shown) provided on an upper end of the cylinder 2 and the outer cylinder 3 to the outside of the cylinder 2. A base valve (not shown) is provided at a lower end portion of the cylinder 2. The base valve permits communication between the lower cylinder chamber 2b and the reservoir 4 with an appropriate flow resistance. A hydraulic fluid is sealably contained in the cylinder 2, and a hydraulic fluid and a gas are sealably contained in the reservoir 4.

An extension-stroke passage 13 and a compression-stroke passage 14 are formed in the piston 5 so as to permit communication between the upper cylinder chamber 2a and the lower cylinder chamber 2b.

The extension-stroke damping force control mechanism 6 is arranged as follows. An inner valve member 16 is fitted into an outer valve member 15 generally in the form of a cylinder, one end of which is closed, and a hydraulic fluid passage 17 and a hydraulic fluid passage 18 are formed on a radially inner side and a radially outer side of the closed end of the outer valve member 15. The hydraulic fluid passage 17 is communicated with the extension-stroke passage 13. The hydraulic fluid passage 18 is open to the lower cylinder chamber 2b. An annular seat portion 19 protrudes from the closed end of the outer valve member 15 between the hydraulic fluid passage 17 and the hydraulic fluid passage 18. An annular seal portion 20 protrudes from the closed end of the outer valve member 15 outside the hydraulic fluid passage 18. A disk valve 21 is seated on the seat portion 19 and an annular seal ring 22 is provided on an outer peripheral portion of the disk valve 21 and the seal portion 20. A spring member 22A is provided on an inner peripheral portion of the seal ring 22, and presses the disk valve 21 and the seal ring 22 against the seat portion 19 and the seal portion 20.

In the outer valve member 15, a back-pressure chamber (a pilot chamber) 23 is formed by the inner valve member 16 at the back of the disk valve 21 and the seal ring 22. In the inner valve member 16, a hydraulic fluid passage 24 is provided so as to permit communication between the back-pressure chamber 23 and the lower cylinder chamber 2b. A relief valve (a disk valve) 25 is provided in the hydraulic fluid passage 24 so as to relieve the hydraulic pressure in the back-pressure chamber 23 by the flow of the hydraulic fluid into the lower cylinder chamber 2b. An orifice (a cut portion) 25A is formed in a valve seat for the relief valve 25 so that the back-pressure chamber 23 is always communicated with the lower cylinder chamber 2b.

A cylindrical portion of the piston bolt 8 extending through the piston 5, the outer valve member 15, the inner valve member 16 and a spacer 26 includes ports 28, 30 and 33 formed in a side wall thereof. The port 28 is communicated with the extension-stroke passage 13 through an orifice passage 27. The port 30 is communicated with the back-pressure chamber 23 through a check valve 29 provided in the inner valve member 16. The port 33 is communicated with the lower cylinder chamber 2b through a check valve 32 provided in the spacer 26. The check valve 29 prevents flow of the hydraulic fluid from the back-pressure chamber 23 to the port 30. The check valve 32 prevents flow of the hydraulic fluid from the lower cylinder chamber 2b to the port 33.

A small-diameter bore 34 is formed in the cylindrical portion of the piston bolt 8 on a side of the proximal end portion of the piston bolt 8 and a large-diameter bore 35 is formed in the cylindrical portion of the piston bolt 8 on a side of a distal end portion of the piston bolt 8. A slider 36 is inserted into the cylindrical portion of the piston bolt 8 and has a slidable fit on the interior of the piston bolt 8 in the small-diameter bore 34. A plug 37 is screwed into a distal end portion of the large-diameter bore 35. A cylindrical valve body 39 is formed at an end portion of the slider 36 so as to face an annular valve seat 38 formed at an end portion of the plug 37. The port 28 and the port 30 in the piston bolt 8 are always communicated with each other through the large diameter bore 35. The ports 28 and 30 are communicated with the port 33 through a hydraulic fluid passage 40 formed in the plug 37. The valve body 39 is separated from or brought into contact with the valve seat 38, to thereby permit or prevent communication between the ports 28 and 30, and the port 33.

In the large-diameter bore 35, the slider 36 includes a pressure-receiving portion (a stepped portion) 41 formed in a manner such as to reduce the diameter of the portion of the slider 36 on a side close to the valve body 39. The end portion of the slider 36 on a side of the valve body 39 abuts against a compression spring 43 which is provided between the slider 36 and a spring bearing 42 threadably engaged with the plug 37. An end portion of the slider 36 on a side opposite to the valve body 39 abuts against a plunger 45 of a proportional solenoid (an actuator) 44 provided in the solenoid case 10. A compression spring 46 is provided on a rear side of the plunger 45.

The valve seat 38, the valve body 39 and the pressure-receiving portion 41 provide a pressure control valve. The valve body 39 of the slider 36 is pressed against the valve seat 38 under the differential or resultant spring force of the compression spring 43 and the compression spring 46. When the hydraulic pressure in the large-diameter bore 35 acting on the pressure-receiving portion 41 exceeds a predetermined control pressure, the valve body 39 is lifted from the valve seat 38 against the resultant spring force of the compression spring 43 and the compression spring 46. The control pressure can be adjusted by controlling a thrust of the plunger 45 of the proportional solenoid 44, that is, the magnitude of a current applied to a coil 47 of the proportional solenoid 44.

The compression-stroke damping force control mechanism 7 is arranged as follows. An inner valve member 49 is fitted into an outer valve member 48 generally in the form of a cylinder, one end of which is closed, and a hydraulic fluid passage 50 and a hydraulic fluid passage 51 are formed on a radially inner side and a radially outer side of the closed end of the outer valve member 48. The hydraulic fluid passage 50 is communicated with the compression-stroke passage 14. The hydraulic fluid passage 51 is open to the upper cylinder chamber 2a. An annular seat portion 52 protrudes from the closed end of the outer valve member 48 between the hydraulic fluid passage 50 and the hydraulic fluid passage 51. An annular seal portion 53 protrudes from the closed end of the outer valve member 48 outside the hydraulic fluid passage 51. A disk valve 54 is seated on the seat portion 52 and an annular seal ring 55 is provided on an outer peripheral portion of the disk valve 54 and the seal portion 53. A spring member 56 is provided on an inner peripheral portion of the seal ring 55, and presses the disk valve 54 and the seal ring 55 against the seat portion 52 and the seal portion 53.

In the outer valve member 48, a back-pressure chamber (a pilot chamber) 57 is formed by the inner valve member 49 at the back of the disk valve 54 and the seal ring 55. In the inner valve member 49, a hydraulic fluid passage 58 is provided so as to permit communication between the back-pressure chamber 57 and the upper cylinder chamber 2a. A relief valve (a disk valve) 59 is provided in the hydraulic fluid passage 58 so as to relieve the hydraulic pressure in the back-pressure chamber 57 by the flow of the hydraulic fluid into the upper cylinder chamber 2a. An orifice (a cut portion) 59A is formed in a valve seat of the relief valve 59 so that the back-pressure chamber 57 is always communicated with the upper cylinder chamber 2a.

The cylindrical portion of the piston bolt 8 extending through the piston 5, the outer valve member 48 and the inner valve member 49 includes ports 61 and 63 formed in the side wall thereof. The port 61 is communicated with the compression-stroke passage 14 through an orifice passage 60. The port 63 is communicated with the back-pressure chamber 57 through a check valve 62 provided in the inner valve member 49. The check valve 62 prevents flow of the hydraulic fluid from the back-pressure chamber 57 to the port 63.

A spool (a flow rate control valve) 64 for controlling the flow path area of a flow passage between the port 61 and the port 63 is formed in the slider 36 which is slidably fitted into the small-diameter bore 34 of the piston bolt 8. Lands of the spool 64 are provided, such that when the slider 36 moves downward as viewed in FIG. 1 and reaches a position such that the valve body 39 is seated on the valve seat 38, the spool 64 prevents communication between the port 61 and the port 63, and that when the slider 36 moves upward from the above-mentioned position by an amount exceeding a predetermined level, the spool 64 gradually opens to allow communication between the port 61 and the port 63.

Hydraulic fluid passages 65 and 66 axially extend through the slider 36 and the plunger 45, so as to permit communication between hydraulic fluid chambers formed on opposite ends of the hydraulic fluid passages 65 and 66. This ensures a smooth axial movement of the slider 36 and the plunger 45. The inside of the proportional solenoid 44 is communicated with the upper cylinder chamber 2a through an orifice passage 67 which has a sufficiently small size and is formed in the solenoid case 10. Air in the proportional solenoid 44 is discharged through the orifice passage 67 to the upper cylinder chamber 2a. A lead wire 68 connected to the coil 47 of the proportional solenoid 44 extends through the piston rod 11 having a hollow structure and is connected to a terminal (not shown) provided at a distal end portion of the piston rod 11. Thus, electricity is externally applied to the proportional solenoid 44.

Next, description is made with regard to an operation of the above-mentioned controllable damping force hydraulic shock absorber.

During an extension stroke of the piston rod 11, the fluid in the upper cylinder chamber 2a flows to the lower cylinder chamber 2b through the extension-stroke passage 13, the orifice passage 27, the port 28, the large-diameter bore 35, the hydraulic fluid passage 40 and the port 33, thus generating a damping force according to the position of the valve body 39. When the hydraulic pressure on a side of the upper cylinder chamber 2a reaches the valve-opening pressure of the disk valve 21, the disk valve 21 opens and the fluid flows through the extension-stroke passage 13, the hydraulic fluid passage 17 and the hydraulic fluid passage 18 to the lower cylinder chamber 2b. Thus, a damping force is generated by means of the disk valve 21. During a compression stroke of the piston 11, the fluid on a side of the lower cylinder chamber 2b flows through the compression-stroke passage 14, the hydraulic fluid passage 50 and the hydraulic fluid passage 51 to the upper cylinder chamber 2a. Thus, a damping force is generated by means of the disk valve 54.

Figure 2:
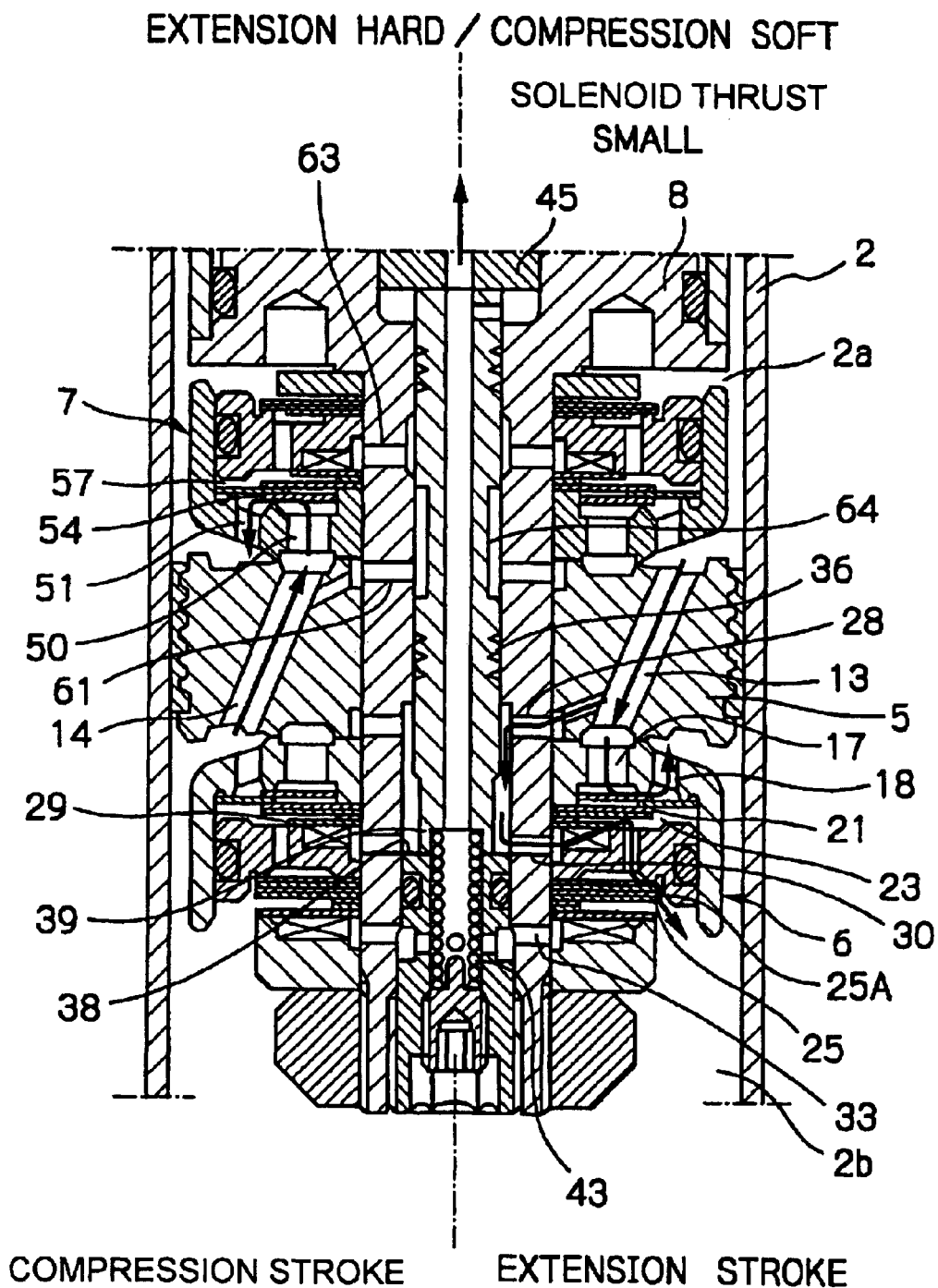
FIG. 2 is a partial illustration indicating the flow of hydraulic fluid in the controllable damping force hydraulic shook absorber of FIG. 1 when firm damping is effected during an extension stroke, and soft damping is effected during a compression stroke.

When the magnitude of a current applied to the coil 47 is reduced to thereby reduce the thrust given to the plunger 45 of the proportional solenoid 44, as shown in FIG. 2, the slider 36 moves downward due to the effect of the resultant spring force of the compression spring 43 and the compression spring 46, thus pressing the valve body 39 against the valve seat 38 while preventing communication between the port 61 and the port 63 by means of the spool 64. In this instance, in the extension-stroke damping force control mechanism 6, the control pressure of the valve body 39 becomes high, and the pressure in the back-pressure chamber 23 increases, to thereby increase the valve-opening pressure of the disk valve 21. Consequently, a large damping force is generated (firm damping is effected) during an extension stroke (see the right side of FIG. 2). It should be noted that when the hydraulic pressure in the back-pressure chamber 23 reaches a predetermined relief pressure, the relief valve 25 opens to relieve the hydraulic pressure in the back-pressure chamber 23 by the flow of the fluid into the lower cylinder chamber 2b.

More particularly, when the pressure in the large bore 35 increases while the valve body 39 rests on the valve seat 38, the pressure slightly lifts the valve body. The extent of this lift usually does not exceed about 0.2 mm since when the valve body 39 is separated from the valve seat 38, the pressure in the large bore 35 is immediately relieved to cause the valve body to move back toward the valve seat. These movements are repeated and establish a control pressure in the large bore which is generally of a predetermined value corresponding to the current applied to the coil 47.

On the other hand, in the compression-stroke damping force control mechanism 7, because the communication between the port 61 and the port 63 is prevented by means of the spool 64, the pressure in the back-pressure chamber 57 becomes low, and the valve-opening pressure of the disk valve 54 decreases, so that a small damping force is generated (soft damping is effected) during a compression stroke (see the left side of FIG. 2). When the valve body 39 as a pressure control valve opens due to the pressure in the large bore 35, the amount of lift from the valve seat 38 is about 0.2 mm as previously stated. The amount of stroke required for opening the spool 64 as a flow rate control valve is about 0.5 mm. Therefore, the spool 64 remains closed when the valve body 39 opens.

Figure 3:
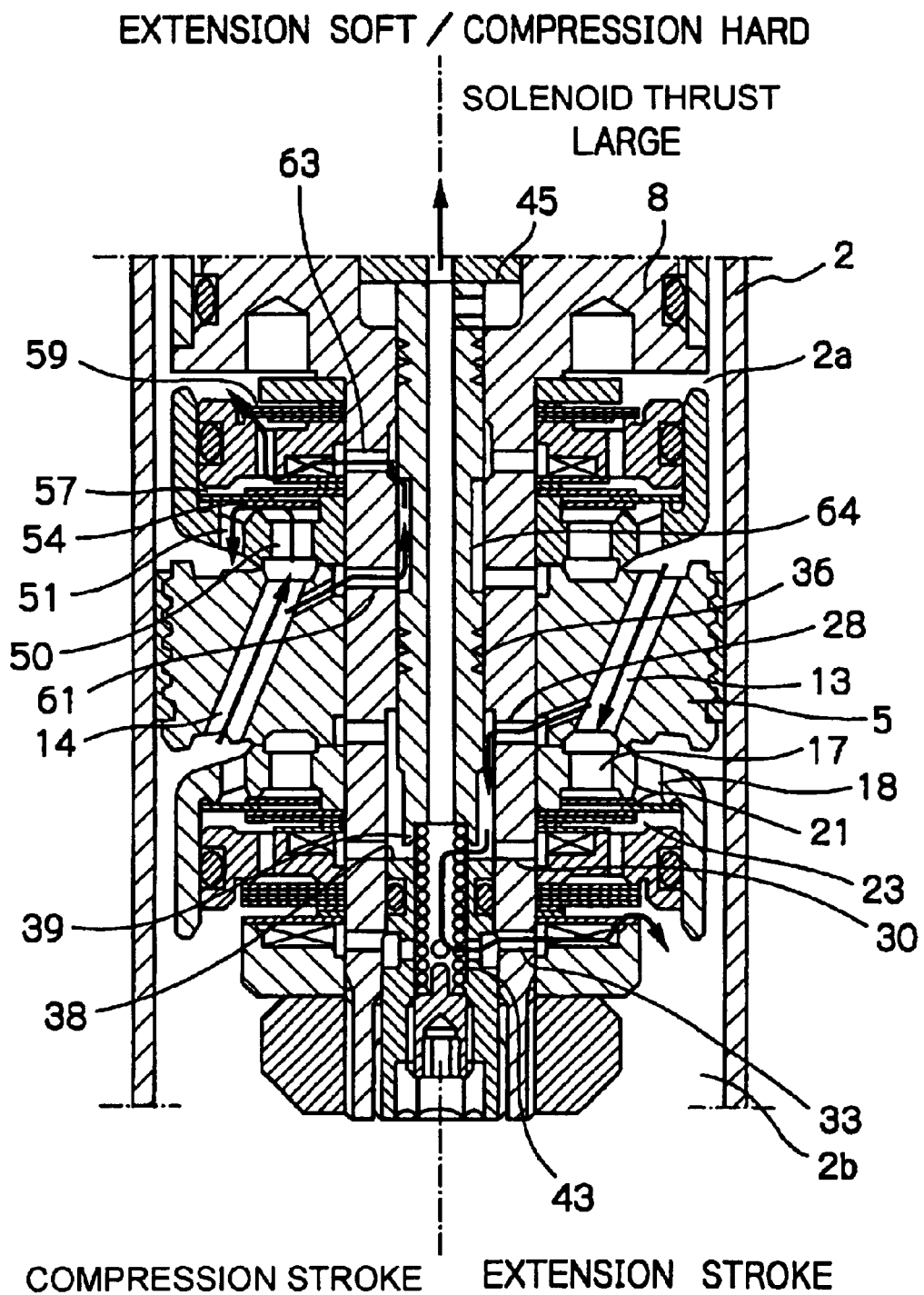
FIG. 3 is a partial illustration indicating the flow of hydraulic fluid in the controllable damping force hydraulic shock absorber of FIG. 1 when soft damping is effected during an extension stroke, and firm damping is effected during a compression stroke.

When the magnitude of the current applied to the coil 47 is increased to thereby increase the thrust given to the plunger 45 of the proportional solenoid 44, as shown in FIG. 3, the slider 36 moves upward against the resultant spring force of the compression spring 43 and the compression spring 46 and separates the valve body 39 from the valve seat 38, while allowing communication between the port 61 and the port 63 through the spool 64. In this instance, in the extension-stroke damping force control mechanism 6, the control pressure of the valve body 39 is relieved and the pressure in the back-pressure chamber 23 decreases, to thereby decrease the valve-opening pressure of the disk valve 21. Therefore, a small damping force is generated (soft damping is effected) during an extension stroke (see the right side of FIG. 3).

On the other hand, in the compression-stroke damping force control mechanism 7, because the port 61 and the port 63 are communicated with each other through the spool 64, the pressure in the back-pressure chamber 57 becomes high, and the valve-opening pressure of the disk valve 54 increases. Therefore, a large damping force is generated (firm damping is effected) during a compression stroke (see the left side of FIG. 3). When the hydraulic pressure in the back-pressure chamber 57 reaches a predetermined relief pressure, the relief valve 59 opens to relieve the hydraulic pressure in the back-pressure chamber 57 by the flow of the fluid into the upper cylinder chamber 2a.

Thus, a current is applied to the coil 47 of the proportional solenoid 44, to thereby control the pressure control valve in the extension-stroke damping force control mechanism 6 and the flow rate control valve in the compression-stroke damping force control mechanism 7 and hence the valve-opening pressures of the disk valves 21 and 54, thus enabling a damping force to be controlled within a wide range. By using the proportional solenoid 44 as a single actuator, the slider 36 is moved, to thereby control a damping force for an extension stroke and a damping force for a compression stroke at the same time. It is possible to provide firm damping for an extension stroke and soft damping for a compression stroke, or provide soft damping for an extension stroke and firm damping for a compression stroke, that is, so-called reverse characteristics of a damping force can be obtained. Further, the slider 36 is integrally formed with the valve body 39 of the pressure control valve having a short length and the spool 64 of the flow rate control valve having a wide control range of a damping force. Thus, a flow rate control valve is used for only one of an extension stroke and a compression stroke of the piston rod, resulting in a reduction in size of the controllable damping force hydraulic shock absorber. Further, because a pressure control valve is used for only the other stroke of the piston rod, it is unnecessary to effect individual adjustments of both the set load of the spring 43 and the set load of the spring 46. Therefore, the controllable damping force hydraulic shock absorbers can be readily manufactured on a mass production basis.

In the above-mentioned embodiment, a pressure control valve is used as the pilot control valve of the extension-stroke damping force control valve, and a flow rate control valve is used as the pilot control valve of the compression-stroke damping force control valve. However, the present invention is not limited to this embodiment. An arrangement may be made by using a flow rate control valve as the pilot control valve of the extension-stroke damping force control valve and a pressure control valve as the pilot control valve of the compression-stroke damping force control valve. Further, in the above embodiment, the damping force control valve is formed in the piston assembly. However, the present invention is not limited to this embodiment. The present invention may be applied to a so-called lateral type controllable damping force hydraulic shock absorber in which a hydraulic fluid passage is provided outside the cylinder and the pilot type damping force control valve is provided in this hydraulic fluid passage.

As has been described above, in the controllable damping force hydraulic shock absorber of the present invention, either one of the pilot control valve for an extension stroke and the pilot control valve for an compression stroke comprises a flow rate control valve, and the other pilot control valve comprises a pressure control valve. Thus, by using a combination of a flow rate control valve having a wide control range of a damping force and a pressure control valve having a short length, it is possible to obtain a controllable damping force hydraulic shock absorber which is compact in size and capable of controlling a damping force within a wide range.

Further, in the controllable damping force hydraulic shock absorber of the present invention, a valve body of the pilot control valve for an extension stroke and a valve body of the pilot control valve for a compression stroke may be integrally connected to each other and enable reverse characteristics of damping force to be obtained, the valve bodies being adapted to be operated by a single actuator. With this arrangement, reverse characteristics of damping force can be obtained by controlling a single actuator.

Further, in the controllable damping force hydraulic shock absorber of the present invention, the pilot control valve for an extension stroke may comprise the pressure control valve and the pilot control valve for a compression stroke may comprise the flow rate control valve. With this arrangement, damping force characteristics for a compression stroke can be controlled within a wide range.

What is claimed is:

1. A controllable damping force hydraulic shock absorber comprising:

a cylinder in which a hydraulic fluid is sealably contained;

a piston slidably fitted in the cylinder;

a piston rod having one end connected to the piston and the other end extended to the outside of the cylinder;

an extension-stroke passage which allows flow of the hydraulic fluid during an extension stroke of the piston rod;

a compression-stroke passage which allows flow of the hydraulic fluid during a compression stroke of the piston rod;

an extension-stroke pilot type damping force control valve in which the flow of the hydraulic fluid in the extension-stroke passage is controlled due to the effect of a pressure in a pilot chamber, to thereby generate a damping force; and a compression-stroke pilot type damping force control valve in which the flow of the hydraulic fluid in the compression-stroke passage is controlled due to the effect of a pressure in a pilot chamber, to thereby generate a damping force, each of the extension-stroke pilot type damping force control valve and the compression-stroke pilot type damping force control valve including a pilot control valve provided therein so as to control the hydraulic fluid in the pilot chamber, wherein one of the pilot control valve provided in the extension-stroke pilot type damping force control valve and the pilot control valve provided in the compression-stroke pilot type damping force control valve comprises a flow rate control valve, the flow rate control valve being adapted to control a flow path area of a flow passage connected to the pilot chamber of the one pilot control valve to a desired flow path area by means of an actuator, and the other pilot control valve comprises a pressure control valve, the pressure control valve being adapted to control the pressure in the pilot chamber of the other pilot control valve to a desired pressure by means of an actuator.

2. A controllable damping force hydraulic shock absorber according to claim 1, wherein a valve body of the pilot control valve provided in the extension-stroke pilot type damping force control valve and a valve body of the pilot control valve provided in the compression-stroke pilot type damping force control valve are integrally formed to enable reverse characteristics of damping force to be obtained, the valve bodies being adapted to be operated by a single actuator.

3. A controllable damping force hydraulic shock absorber according to claim 1, wherein the pilot control valve provided in the extension-stroke pilot type damping force control valve comprises the pressure control valve and the pilot control valve provided in the compression-stroke pilot type damping force control valve comprises the flow rate control valve.

4. A controllable damping force hydraulic shock absorber according to claim 2, wherein the pilot control valve provided in the extension-stroke pilot type damping force control valve comprises the pressure control valve and the pilot control valve provided in the compression-stroke pilot type damping force control valve comprises the flow rate control valve.

* * * * *